United States Patent [19]

Stewart et al.

[11] 4,130,130
[45] Dec. 19, 1978

[54] VALVE WITH VARIABLE SECONDARY ORIFICE

[75] Inventors: Robert D. Stewart, Greenville, R.I.; James A. Schretter, Framingham, Mass.

[73] Assignee: Crosby Valve & Gage Company, Wrentham, Mass.

[21] Appl. No.: 741,667

[22] Filed: Nov. 15, 1976

[51] Int. Cl.² ............................................. F16K 17/20
[52] U.S. Cl. ..................................... 137/475; 137/478
[58] Field of Search ................. 137/478, 476, 475, 477

[56] References Cited

U.S. PATENT DOCUMENTS

| 1,231,330 | 6/1917 | Clark | 137/478 |
|---|---|---|---|
| 1,233,752 | 7/1917 | Clark | 137/478 |
| 1,690,097 | 11/1928 | Ackermann | 137/475 X |
| 2,035,129 | 3/1936 | Hopkins | 137/478 |
| 2,517,858 | 8/1950 | Farris | 137/478 X |
| 2,799,291 | 7/1957 | Orr | 137/478 |
| 2,821,208 | 1/1958 | Farris | 137/478 |
| 2,878,828 | 3/1959 | Klafstad | 137/478 |
| 3,001,545 | 9/1961 | Ziege | 137/478 |
| 3,354,900 | 11/1967 | Ferrill | 137/477 |

Primary Examiner—Harold W. Weakley
Attorney, Agent, or Firm—Kenway & Jenney

[57] ABSTRACT

A valve comprising inlet means having a bore, a seat at one end of the bore and an annular outer edge portion. A primary orifice is defined by a valve member and the seat, and a secondary orifice is defined by the valve member and the outer edge portion. The valve member has a shroud portion formed to cause the cross sectional flow area of the secondary orifice to increase at a non-linear rate as the valve member is raised from the seat. With these parts formed to provide a huddling chamber communicating between the primary and secondary orifices, the valve has a quick full opening, non-vibratory characteristic suitable for spring-loaded liquid pressure safety relief service.

7 Claims, 4 Drawing Figures

FIG. 2
FIG. 3
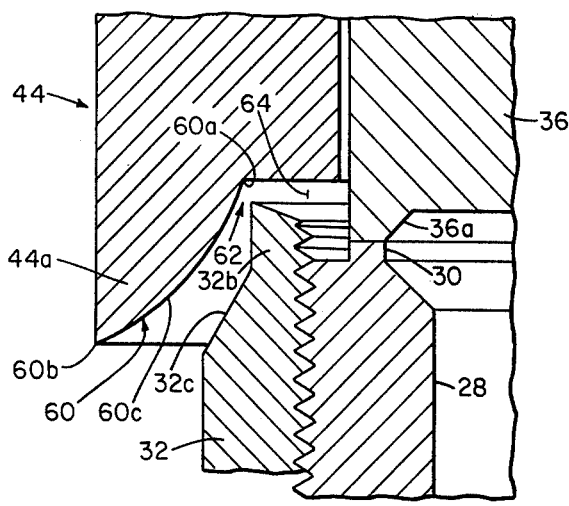
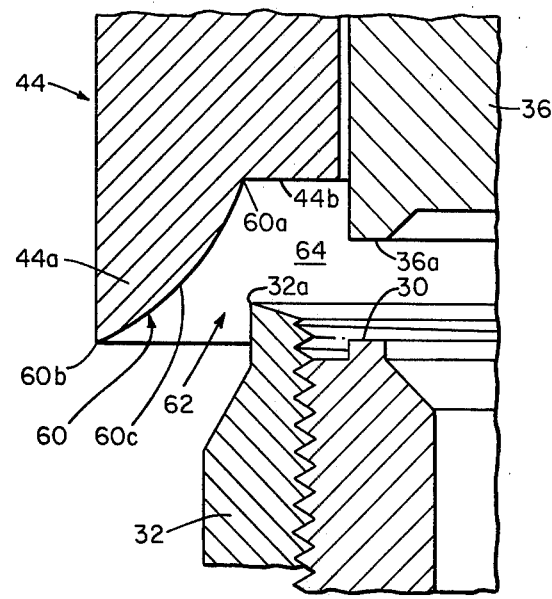
FIG. 4
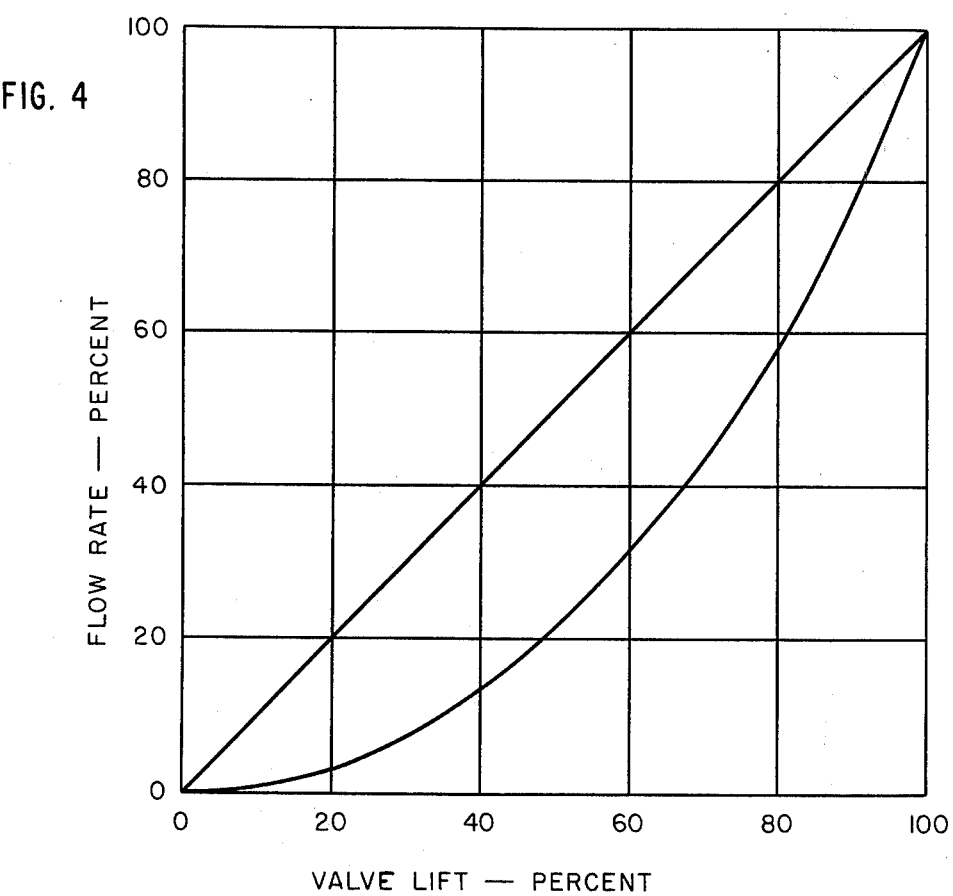

VALVE WITH VARIABLE SECONDARY ORIFICE

BACKGROUND OF THE INVENTION

This invention relates in general to valves adapted for pressure relief service and having provision to surpress vibrations. More specifically, it encompasses relief valves operable with incompressible fluids, the valves achieving full lift with small overpressure accumulation and closing at a uniform adjustable pressure below the set point. These features are achieved without restricting the maximum flow capacity of the valves.

In pressurized fluid systems such as the pressure vessels commonly used in the petrochemical industry, it is necessary to provide a safety relief valve that will relieve pressure from the system during an overpressure condition by venting fluid from the system. Optimally, the valve should open when the system pressure exceeds a predetermined set point or pressure and quickly reach a full open or "full lift" position without an excessive overpressure build up. Also, the valve should close as soon as it has vented the minimal volume of fluid that is sufficient to return the system pressure to a predetermined safe level below the set pressure. A rapid closing or "blow down" prevents an excessive loss of fluid from the system. In practice, these objects are more difficult to achieve with incompressible fluids than with compressibly fluids.

Conventional safety relief valves employ a disc that engages a valve seat formed on a nozzle. A spring is adjustable to counterbalance the system relief set pressure. When the system pressure exceeds the set pressure, the disc, and typically a disc holder that together form a valve head, move upwardly against the force of the spring. It is common to employ a disc holder and disc that overhang the nozzle. Thus when the system pressure is sufficient to crack the valve open, it acts on the additional overhang area to provide an additional force for lifting the valve. While this overhang area can be useful in causing a quick opening of the valve, the fluid forces on it tend to resist closing until the system pressure has decayed to a value substantially below the set pressure.

While valves of this generaly type, described for example in U.S. Pat. Nos. 2,880,751 and 3,854,494, perform satisfactorily with compressible fluids such as steam and air, they are generally unstable and vibrate excessively when used with incompressible fluids such as water, oil and liquids generally. The conventional relief valve for liquid service does not achieve full lift and therefore its maximum rated flow capacity until the overpressure reaches a level in the range of 15% to 25% above the set pressure. Also, the closing pressure is typically not controllable and is well below the set pressure of the valve.

Moreover, when many conventional relief valves are adjusted to operate close to the set pressure, they become dynamically unstable and vibrate in a violent and destructive manner. The vibrations are typically characterized as "chatter", "flutter", and "hammer." Chatter occurs when the valve opens but remains in close proximity to the nozzle seat. Flow induced vibrations then cause the valve to strike the seat repeatedly. This condition can quickly destroy the integrity of the valve seat. Fluttering describes valve cycling due to flow induced vibrations where there is no metal-to-metal contact. Hammering occurs when there are broad fluctuations in the system pressure causing the valve disc to lift substantially and then to slam against the valve seat. These conditions are generally indicative of an unstable valve that will require frequent maintenance such as replacement of main seats, guiding surfaces and bellows. Also, such conditions can eventually destroy the valve, work it loose at its fittings and damage the associated equipment.

Another problem with relief valves is that when they are used with gases carrying moisture, the rapid expansion of the gas as it leaves the nozzle can cause the moisture to form as ice on the valve seat. This ice may prevent the valve from closing properly.

Hitherto, solutions to the stability problem have centered on mechanisms to retard movement of the valve head or to choke the fluid flow. U.S. Pat. No. 2,792,015 to Smith is an example of a liquid relief valve that employs a flow restriction in the nozzle. When valves with such restrictions are used in a system it is frequently necessary to employ a larger valve than normal to compensate for the restrictions and thereby to achieve the desired flow capacity.

The Smith valve also utilizes a valve member that overhangs and projects downwardly from the nozzle to generate a "pop" to full lift and to guide the flow. U.S. Pat. No. 3,520,326 to Bowen et al and U.S. Pat. No. 3,572,372 to Moore describe spring loaded relief valves that include adjustable nozzle rings that guide the flow in cooperation with surrounding, downwardly projecting conical surfaces formed on members secured to the disc or a disc holder. In these structures the downwardly projecting valve surfaces either have an insignificant effect on the flow rate as compared with the orifice at the main seat, or they affect the flow rate as a substantially linear function of the valve position. The fluid forces acting on these downwardly projecting surfaces vary as a linear function of the distance the valve disc has lifted off the seat.

Canadian Pat. No. 797,570 describes a skirt member secured on a disc holder that together with a nozzle ring defines a "huddle chamber" to control fluid pressures in the valve. In this valve, however, the flow is increasingly restricted as the valve moves toward its fully open position.

It is an object of this invention to provide a disc-type valve structure useful in a spring-loaded relief valve for liquids as well as gases, that automatically and quickly achieves full lift or pop-type opening to a full lift position with a relatively small overpressure, reseats at an adjustable pressure just below the set pressure, and is dynamically stable.

Another object is to eliminate the problem of icing at the seat in such a valve.

A further object of this invention is to provide a relief valve that does not choke the flow or otherwise restrict the full flow capacity, thus having a desirable "gain characteristic" defined as the relationship of flow rate to valve travel.

Another object is to provide a liquid relief valve that achieves full lift within 10% of set pressure and does not chatter, flutter or hammer.

Still other objects are to provide a relief valve having the advantages hereinafter appearing, that requires relatively low maintenance and repairs and has a long product life and a cost of manufacture comparable to that of conventional relief valves.

SUMMARY OF THE INVENTION

This invention is described in its application to a spring-loaded safety relief valve designed particularly for use with liquid systems. A curved inwardly facing surface is formed on a shroud portion of the valve head, the shroud portion being situated opposite to and spaced from a nozzle ring. The curved surface and the outer upper edge of the nozzle ring define an annular secondary flow orifice that effectively controls the volumetric flow rate of fluid through the valve after it cracks open. The curved surface slopes away from the ring in a downward axial direction to provide a non-linear relationship between the flow rate at the secondary orifice and the axial distance between a valve disc and the valve seat. The curve is nonlinear and the "gain characteristic" has an increasing slope, preferably following a parabolic or similar curve, starting with a relatively low rate of flow when the valve barely opens and with an increasing acceleration of the flow rate as the valve moves from its closed position toward the full lift, maximum flow capacity position. The curved surface controls the effective lifting area as the valve moves toward and away from full lift.

Also in the preferred form, the curved surface is formed on the lower end of a disc holder and the upper portion of the nozzle ring has a reduced outer diameter. The spacing between the upper outer edge of the nozzle ring and the curved surface preferably presents the region of most restricted flow in the valve to transfer flow control to this "secondary" orifice when the valve starts to open and to promote icing at this orifice in preference to the valve seat. These and other features and objects of the invention will be more fully understood from the following detailed description of the illustrated embodiment with reference to the accompanying drawings.

BRIEF DESCRIPTION OF THE DRAWINGS

FIG. 2 is a detailed view corresponding to FIG. 1 of the novel flow control structures of this invention;

FIG. 3 is a view corresponding to FIG. 2 with the valve in its full-lift position; and FIG. 4 is a graph of the parabolic gain characteristics of the valve shown in FIGS. 1-3 as compared to the linear gain characteristics of conventional relief valves.

DETAILED DESCRIPTION OF THE ILLUSTRATED EMBODIMENTS

Figure 1:
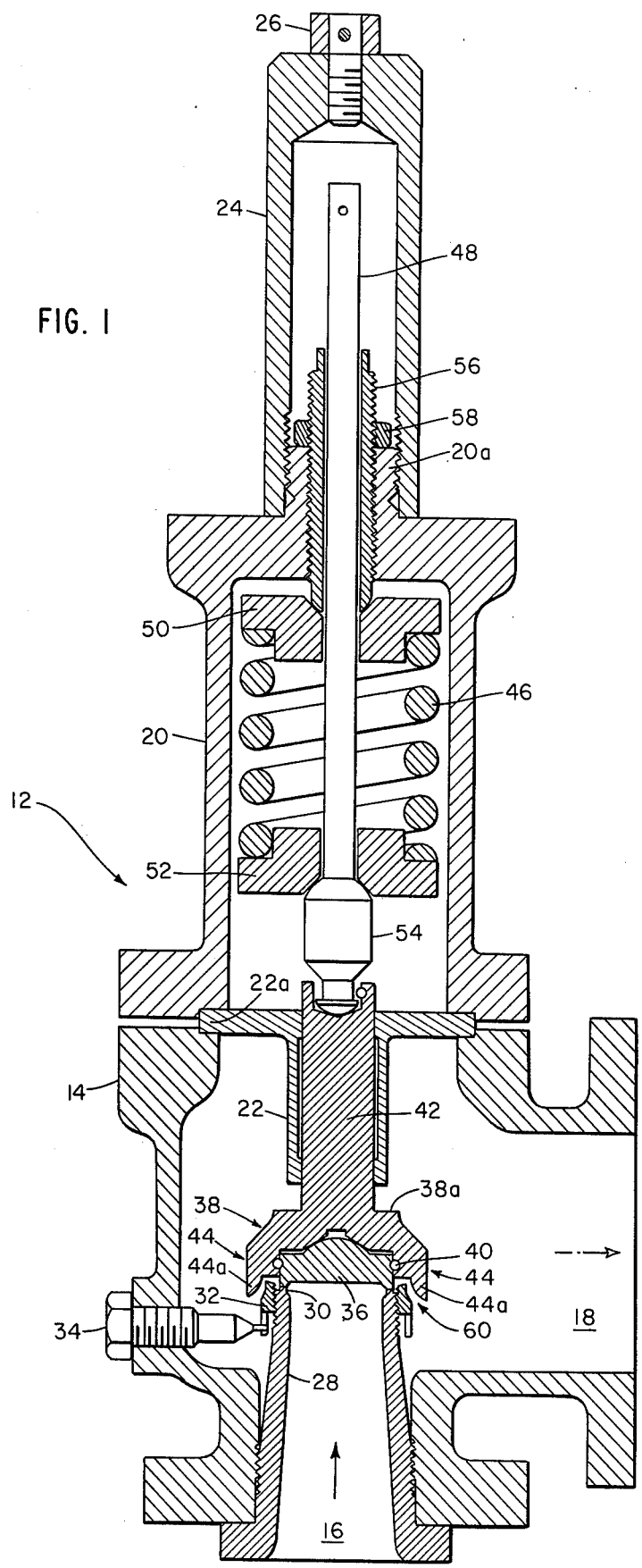
FIG. 1 is a view in vertical section of a spring-loaded relief valve constructed according to the invention in its closed position.

FIG. 1 shows a sping-loaded relief valve 12 constructed according to the invention which has a body 14 with an inlet passage 16 and an outlet passage 18. A spring bonnet 20 is secured to an upper portion of the body with a guide member 22 having a flanged portion 22a sandwiched between the bonnet 20 and an upper portion of the body 14. A cap 24 is threaded onto an upper portion 20a of the bonnet 20. The cap 24 has a cap plug 26 threaded in its upper end.

A generally tubular nozzle 28 is threadedly engaged to the body 14 at the inlet passage 16. The bore of the nozzle 28 is in direct fluid communication with the fluid system serviced by the valve. A valve seat 30 is formed at the upper end of the nozzle 28. An adjustable nozzle ring 32 is threaded onto the outer upper surface of the nozzle 28. A set screw 34 threaded in the body 14 secures the nozzle ring 32.

A valve disc 36 has a seat portion 36a (FIGS. 2 and 3) that engages the valve seat 30 when the valve is in its closed position to block a fluid flow from the nozzle 16 to the outlet passage 18. The valve disc is replaceably secured in a disc holder 38 by two pins 40. The pins 40 and the ball and socket bearing relationship of the disc and the disc holder allow the disc to be self leveling as it engages the seat 30. The disc holder 38 has a stem portion 42 that is slidable within the guide 22 in an axial direction, vertically as shown, and a lower end portion 44 that is generally coaxial with and surrounds the seat 30.

The disc 36 and the disc holder 38 form a valve member or valve head that is movable vertically between a closed position as shown in FIGS. 1 and 2 and a fully opened or full lift position shown in FIG. 3. In the full lift position, the upper surface 38a of the disc holder bears against the lower end of the guide 22. A spring 46 urges the valve member to close on the seat. The spring 46 acts on the disc holder 38 through a spindle rod 48, a pair of spindle washers 50 and 52, and a spindle point 54 secured to the lower end of the spindle rod 48. As shown, the lower spindle washer 52 bears on the upper surface of the spindle point 54 and the upper spindle washer 50 is restrained against an upward movement by contact with an adjusting bolt 56 threading into the upper end of the bonnet 20. The adjusting bolt 56 is secured by an adjusting bolt nut 58. When the nut 58 is backed off from the upper surface of the bonnet portion 20a, the adjusting bolt 56 can be rotated to adjust the force exerted by the spring 46 on the valve member. This adjustability allows the valve to be set to crack open at a predetermined set pressure.

With particular reference to FIGS. 2 and 3, a principal feature of the invention is an annular, inwardly-facing, contoured surface 60 formed on a shroud portion 44a of the disc holder portion 44. The shroud portion 44a is generally opposite to and spaced from the nozzle ring 32. The surface 60 is preferably an arc of a circle with the inner diameter of the shroud portion increasing in an axial direction toward the nozzle (downwardly as shown). It increases from a point of minimum diameter 60a adjacent a generally planar, horizontal, and annular lower surface 44b of the disc holder to a point of maximum inner diameter at the lower-most outer edge 60b. Near its midpoint, the curve 60 passes through a point 60c that is closest to the nozzle ring 32 when the valve is in its full lift position. The lower surface 44b defines an intermediate portion of the disc holder that extends generally between the central disc 32 to the shroud portion 44a. This portion 44b provides an upward lifting area for the fluid when the valve first cracks open which assists the valve in "popping" quickly to its full lift position.

Although the surface 44b has an influence on valve lift, the principal control is provided by a secondary downstream orifice 62 defined by the contoured surface 60 of the shroud portion and the nozzle ring 32. This orifice has a minimum spacing at the leading or upper, outer edge 32a of the nozzle ring. Except when the valve initially cracks open, the orifice 62 is the most restricted flow area within the valve. This gives the orifice 62 control over the flow rate through the valve during the lift cycle and causes icing, if any, to occur in the orifice 62 rather than on the valve seat 30.

The outer surface of the nozzle ring 32 has a generally stepped configuration with an upper portion 32b of a reduced outer diameter extending from the leading edge 32a to a sloped, generally conical surface 32c. The relief angle of the sloped surface 32c and the height of the nozzle ring portion 32b with respect to the valve seat 30 also influence the effective lifting area but to a much less degree than the orifice 62.

In operation, as the fluid pressure in the system increases above the set pressure, the force which the fluid exerts on the lower surface of the disc 36 exceeds the downward force of the spring 46 causing the disc 36 to lift slightly off the seat 30. This establishes a fluid flow from the nozzle 28, to a huddle chamber 64 defined by the surface 44b, the upper surface of the nozzle ring, the upper surface of the nozzle exterior to the seat 30, and a portion of the disc 36. Fluid flow to the chamber 64 exerts an increasing force on the surface 44a that causes the valve member to lift farther. This additional upward movement of the valve member facilitates flow through the orifice 62 where the fluid pressure can act on the surface 60 to provide still more lifting force. The volume of flow to the orifice 62, and hence the pressure acting on the surface 60 and the lifting force supplied by this surface, is influenced to some extent, as mentioned above, by the height of the nozzle ring portion 32b and the relief angle of the sloped portion 32c, but is controlled principally by the minimum flow area of the orifice defined by the separation of the surface 60 from the leading edge 30a of the nozzle ring.

A significant aspect of this invention is that due to the curvature of the surface 60, the flow rate through the orifice 62 does not increase or decrease linearly with an upward or downward movement, respectively, of the valve head. This relationship is shown graphically in FIG. 4 where the volumetric fluid flow rate through the orifice 62 is plotted as a function of the valve lift. The flow rate is expressed as a percentage of the maximum rated capacity of the valve at full lift and the valve lift is expressed as a percentage of the full lift. The straight line plot in FIG. 4 demonstrates the "gain characteristic" of a conventional valve where a unit increase in the valve lift generates a corresponding unit increase in the flow rate. The curved plot in FIG. 4 demonstrates the parabolic, non-linear gain characteristic of a valve according to this invention. When the valve is near it closed position, the flow rate is small and the rate of charge of the flow rate is also small. When the valve approaches the full lift position, the flow rate is large and the rate of charge of the flow rate is large. This gain characteristic is a direct function of the minimum flow area of the orifice 62. The relation of minimum flow area to valve lift is in turn a direct function of the contour of the surface 60.

This non-linear gain characteristic promotes a dynamically stable valve operation, a quick popping of the valve to full lift with a relatively lower overpressure, and a prompt reseating when the system pressure decays to a valve just below the set pressure. In particular, this invention in liquid service provides full lift within a 10% overpressure, reseats within a 10% under pressure and does not exhibit chatter, flutter or hammering when set to operate within these limits. As mentioned above, the set pressure can be adjusted through the bolt 56. Further, and in sharp contrast to conventional liquid service relief valves where the reseating pressure may be uncontrollable and is often far below the set pressure, with the present invention the blow down is adjustable through the nozzle ring 32 and is frequently just below the set pressure.

Precise values for full lift and blow down pressure will of course vary depending on factors such as the system operating pressure, the nozzle bore diameter, the size and configuration of the flow control surfaces of the disc, disc holder, and nozzle ring, and the ratio between the full lift height and the bore diameter. In the illustrated embodiment, the full lift height is approximately one fourth of the bore diameter. For liquid service, to achieve full lift and blow down within a relatively narrow range of pressures about the set pressure it has been found that the ratio of the full lift area (a circle having a diameter to the point 60c) to the "huddle" area (a circle having a diameter to the point 60a) should be $1.394 \pm 15\%$ to 1 and the ratio of the full lift area to the nozzle bore area at the seating plane (a circle having a diameter to the inner edge of the seat 30) should be $2.105 \pm 20\%$ to 1.

There has been described a valve that is particularly useful as a safety relief valve for liquid service and which achieves lift within 10% of a set pressure, reseats in a controlled manner when the system pressure decays to a value just below the set pressure. The valve also operates in a vibration free, dynamically stable manner without employing limitations on the rated flow capacity of the valve. There has also been described a valve that avoids icing of the valve seat when it is used with moisture carrying gases.

While the invention has been described in its preferred embodiment as a spring-loaded, disc-type relief valve for liquid service, it is also applicable to service with compressible fluids and in other valve applications where it is desired to vary the flow rate with the position of the valve head. In addition, while the invention has been described with reference to a control surface 60 that has a cross-sectional configuration of a circular arc, it will be understood that the surface 60 can assume other non-linear curved shapes provided that they produce the desired non-linear relationship between the flow rate at the orifice 62 and the valve lift. Non-circular surfaces of course, may involve higher manufacturing costs than circular surfaces. It is also contemplated that the shroud portion 44a of the disc holder, which has been described as formed integrally with the disc holder 38, can be a separate member that is secured to the valve head. Still other modifications include non-planar "huddle" regions 44b and valves where there is no nozzle ring and the nozzle interacts directly with the contour surface 60.

These and various other modifications of the invention will become apparent to those skilled in the art from the foregoing description and accompanying drawings. Such modifications are intended to fall within the scope of the appended claims.

What is claimed is:

1. In a valve of the type having an annular valve seat fixed in a valve body, the body providing a fluid path through the seat between an inlet and an outlet, and a movable valve head engageable with the seat and movable away from the seat in response to urging of fluid pressure above a predetermined amount of said inlet, the combination with said body of
   nozzle means of generally tubular configuration in said fluid path, communicating interiorly with said inlet and having an end portion defining said seat and an annular outer edge portion external to the seat, and a valve head having an central surface formed to close on the seat, an annular intermediate surface extending radially outwardly from the central surface, and a shroud surface extending radially outwardly from the intermediate surface and having a portion forming with said outer edge portion a variable annular secondary orifice, said surfaces forming with said nozzle means a huddle chamber communicating interiorly with the seat, the secondary orifice communicating between the huddle chamber and the outlet and comprising a restriction in said fluid path, the shroud surface being curved to vary the cross sectional area of said restriction from a minimum valve smaller than that of any restriction within the huddle chamber external to said seat with said central surface in a closed position on the seat to a maximum valve with said central surface at a predetermined maximum spaced position from the seat, the rate of change of said cross sectional area as a function of the spacing between said central surface and the seat increasing from said closed position toward said maximum spaced position, and the cross sectional area of said restriction being smaller than that defined between said central surface and the seat at positions of said central surface above an initial value upon movement from said closed position between said closed and maximum spaced positions.

2. The combination of claim 1, with a spring resiliently urging the valve head toward the seat.

3. The combination of claim 1, in which the nozzle means comprise a nozzle of tubular configuration and a nozzle ring attached to an end of the nozzle and having a surface defining said outer edge portion.

4. The combination of claim 3, in which the nozzle ring is adjustably threaded on the nozzle to vary said minimum value.

5. The combination of claim 1, in which the valve head comprises a disc forming said central surface and a disc holder retaining the disc and forming said intermediate and shroud surfaces.

6. The combination of claim 5, in which the disc is pivotal in the disc holder for self-leveling on the seat as the valve is closed.

7. The combination of claim 1, in which the curvature of the shroud surface conforms to a circular arc in a cross sectional plane including the nozzle axis.

* * * * *

UNITED STATES PATENT AND TRADEMARK OFFICE
CERTIFICATE OF CORRECTION

PATENT NO. : 4,130,130
DATED : December 19, 1978
INVENTOR(S) : Robert D. Stewart and James A. Schretter It is certified that error appears in the above–identified patent and that said Letters Patent are hereby corrected as shown below:

Claim 1, column 6, line 62, after "amount", cancel "of" and substitute --at--; column 7, lines 14 and 17, cancel "valve" and substitute --value--.

Signed and Sealed this

Twenty-fourth Day of April 1979

[SEAL]

Attest:

RUTH C. MASON
Attesting Officer

DONALD W. BANNER
Commissioner of Patents and Trademarks